United States Patent
Dai et al.

(10) Patent No.: US 11,301,361 B2
(45) Date of Patent: Apr. 12, 2022

(54) SIDECHAIN TESTING SYSTEM AND METHOD FOR IMPROVING SECURITY AND STABILITY OF A SMART CONTRACT BY GENERATING SIDECHAINS HAVING MIRROR IMAGE ACCOUNTS OF PART OR ALL MAINCHAIN ASSETS

(71) Applicant: Huazhong University of Science and Technology, Hubei (CN)

(72) Inventors: Weiqi Dai, Hubei (CN); Hai Jin, Hubei (CN); Deqing Zou, Hubei (CN); Bingcheng Zhao, Hubei (CN)

(73) Assignee: Huazhong University of Science and Technology, Hubei (CN)

( * ) Notice: Subject to any disclaimer, the term of this patent is extended or adjusted under 35 U.S.C. 154(b) by 130 days.

(21) Appl. No.: 16/774,016

(22) Filed: Jan. 28, 2020

(65) Prior Publication Data
US 2020/0349054 A1 Nov. 5, 2020

(30) Foreign Application Priority Data
May 5, 2019 (CN) .......................... 201910367325.6

(51) Int. Cl.
*G06F 11/36* (2006.01)
*H04L 9/00* (2022.01)
*H04L 9/06* (2006.01)
*H04L 9/32* (2006.01)
*H04L 29/06* (2006.01)

(52) U.S. Cl.
CPC ...... *G06F 11/3656* (2013.01); *G06F 11/3664* (2013.01); *H04L 9/00* (2013.01); *H04L 9/008* (2013.01); *H04L 9/0637* (2013.01); *H04L 9/3265* (2013.01); *H04L 63/00* (2013.01)

(58) Field of Classification Search
CPC ......... H04L 9/00; H04L 63/00; H04L 9/3265; H04L 9/008; H04L 9/0637
USPC ......................................................... 713/157
See application file for complete search history.

(56) References Cited

U.S. PATENT DOCUMENTS

| | | | |
|---|---|---|---|
| 2019/0251018 A1* | 8/2019 | Jin | G06F 11/3696 |
| 2019/0392138 A1* | 12/2019 | Rice | G06F 8/53 |
| 2020/0067697 A1* | 2/2020 | Puddu | G06F 21/602 |
| 2020/0177372 A1* | 6/2020 | Bhamidipati | H04L 9/0637 |
| 2020/0285633 A1* | 9/2020 | Zhuo | H04L 9/0637 |
| 2020/0327112 A1* | 10/2020 | Glickshtein | G06F 16/2365 |

* cited by examiner

Primary Examiner — Bryan F Wright
(74) Attorney, Agent, or Firm — Michael Ye; Rimon Law

(57) ABSTRACT

The present disclosure involves a sidechain testing system and method for improving security and stability of a smart contract.

1 Claim, 3 Drawing Sheets

SIDECHAIN TESTING SYSTEM AND METHOD FOR IMPROVING SECURITY AND STABILITY OF A SMART CONTRACT BY GENERATING SIDECHAINS HAVING MIRROR IMAGE ACCOUNTS OF PART OR ALL MAINCHAIN ASSETS

FIELD

The present invention relates to the field of blockchain, and more particularly to a sidechain testing system for improving security and stability of a smart contract.

DESCRIPTION OF RELATED ART

In a narrow sense, blockchain technology refers to a chain-like data structure wherein data blocks are stringed in chronological order, and it ensures security of distributed account books non-tamperable and non-counterfeitable by means of cryptology. In a broader sense, blockchain technology provides a new distributed infrastructure and calculation paradigm that verify and store data using a blockchain-based data structure; generate and update data using a consensus algorithm for distributed nodes; ensure security of data transmission and access using cryptology; and programs and operates data using a smart contract composed of codes of automated scripts. Sidechains connect different blockchains together to achieve expansion of blockchains and are completely independent of Bitcoin blockchains, while being able to interact with Bitcoin blockchains. Sidechains facilitate transfer of digital assets among different blockchains.

To provide an example, China Patent Publication No. CN108074081A discloses a method and device for transferring virtual resources. The known device includes a decentralization system that has a blockchain, a sidechain and a mainchain. Its method involves: promulgating a hosted smart contract onto the mainchain; when the virtual resources is transferred from the mainchain to the sidechain, having a sender of the virtual resources send a Transfer command to the hosted smart contract; when the virtual resources is transferred from the sidechain to the mainchain, having a miner that has acquired bookkeeping right of the mainchain block send transaction information to the hosted smart contract, and recording the transaction information in a block of the mainchain, wherein the hosted smart contract is provided therein with a voting mechanism, so that after voting form the miner having the block bookkeeping right to the same transaction is satisfied, the hosted smart contract initiates payment. By promulgating a smart contract for hosting virtual resources of sidechains on a mainchain, effective management of the balance of virtual resources on sidechains can be achieved.

As one example, China Patent Publication No. CN108564372A discloses a method of storing data about guest rooms and orders based on blockchains and smart contracts. The known method comprises the following steps: Step 1, setting up a mainchain that having plural participating parties; setting up permission for the mainchain, wherein the permission is the right to final decision that is trusted by all sidechains; Step 2, creating said sidechains, each created by at least one of the plural participating parties of the mainchain; Step 3, deploying smart contracts required by cross-chain interaction on the mainchain and the sidechains; and Step 4, performing cross-chain data transmission across the mainchain and the sidechain. With the known cross-chain data transmission method, cross-chain data transmission in the scene of permission chains can be achieved in a safe, flexible and decentralized manner.

As another example, China Patent Publication No. CN109117097A discloses a based on blockchain-based data storing method and system. The method includes the following procedures. An agent node of a mainchain detects whether its available memory capacity is greater than a present threshold. If yes, the agent node of the mainchain records serial numbers of all the blocks between a start block and an end block to be transferred. An agent node of a sidechain sends all the blocks to a consensus node of the sidechain. After the agent node of the mainchain conforms that all the blocks have passed consensus verification at the sidechain, the agent node mainchain broadcasts block transfer information network-widely. The nodes of the mainchain delete all the blocks according to the block transfer information. Since the nodes of the mainchain are able to transfer and store a part or all of the blocks to sidechains where the memory capacity is not enough, the nodes of the mainchain have more available memory capacity, so that they can store block data more reliably, thereby improving work reliability of the mainchain.

As still another example, China Patent Publication No. CN107038639A discloses rapid transaction alliance chain construction method compatible with multiple asset types. The alliance chain technology is introduced to realize transaction intercommunication of multiple types of digit assets, based on that system safety is guaranteed, a fixed multi-party signature consensus mechanism is introduced to replace workload to prove the dynamic multi-party signature mechanism, and the transaction time is substantially shortened. The method is advantaged in that through breaking transaction barriers among the different asset types, wide compatibility of the transaction system with the various asset types is realized, moreover, a fixed signature set scheme is employed, the consensus achievement time of each node in the system can be substantially reduced, transaction is rapidly achieved, asset transfer efficiency is substantially improved, superior robustness for a Byzantine failure problem is realized, and cracking is difficult.

Emergence of blockchains makes it possible to implement smart contracts instead of traditional text contracts. Where the pre-agreed conditions are satisfied, a smart contract can automatically execute downward to accomplish fund transfer and other functions. A smart contract is a set of commitments defined in digital format and include agreement allowing participating parties of the contract to fulfill the commitments. However, this is accompanied by growing concerns about security vulnerabilities. Logic vulnerabilities existing due to malicious codes left by contract drafters due to negligence or purposely provide attackers with opportunities to steal user assets. Moreover, since blockchains are non-tamperable, it is very difficult to recover the stolen user asset. One example is the DAO event well known in the Bitcoin circle. The DAO project is a crowd-funding project initiated by Slock.it, a blockchain IoT company. Through fund distribution enabled by a smart contract, profit can be paid to the funders according to the respective amounts they contribute. Users can create sub-DAOs by splitting the DAO for different applications and the contract will not start to update the balances and sums of accounts until said splitting operation is done. An attacker thus can attack the contract withdraw mechanism, to perform the splitting operation again before the system updates the balances in response to the previous splitting operation, so as to continuously transfer the funds deposited by users in the contract to another account designated by the attacker. Eventually, Ethereum officially performs hard fork at a block height of 1920000 by updating source codes so as to transfer the funds of the DAO and its sub-DAOs to the address of another contract. Nevertheless, it is objectively impossible to have official intervention or a hard fork every time an incident happens, because may cause time and money waste at the system level that cost much more than value of the assets otherwise lost.

Hence, there is a pressing need for a robust contract vulnerability detecting system for a blockchain network. However, none of the existing open-source blockchain systems provides a robust contract detection mechanism for blockchains. For a contract about to be deployed, as a convention, a local test is carried out by have the first account C1 of the contract and his fellows or a third-party auditor organization he engages. However, due to thinking habit of people, a self-test is usually not effective in revealing logic vulnerabilities in the contract caused by negligence. In addition, if the first account C1 is a malicious attacker himself, and he leaves vulnerabilities intentionally, this is almost unguardable. Detection of vulnerabilities of a smart contract involves checks in three stages. The first stage is to confirm the presence of any vulnerability, or to see whether there is any common security vulnerability in contract codes. The second stage is to determine whether the confirmation of the first stage is trustworthy. A vulnerability-free smart contract is not necessarily a secure contract, and the work here is to make sure the contract is fair and trustworthy. The third stage is to check whether some certain regulations and procedures are followed. Since creation of a contract dictates digital definition of commitments, any carelessness can leave huge vulnerabilities in the contract.

SUMMARY

In view of the shortcomings of prior art, the present disclosure discloses a sidechain testing system for improving security and stability of a smart contract, at least a part of modules of the system being arranged on blockchain nodes of a blockchain network and being configured to connect the blockchain network, for discovering a vulnerability of the smart contract, the sidechain testing system comprises: a first module, used to connect the blockchain network and to receive the smart contract promulgated by a first account, a second account decides whether to participate in a test for the smart contract when it acquires the smart contract through the first module, a third account, when it has acquired the smart contract, forks a mainchain so as to form a sidechain and deploys the smart contract on the sidechain; wherein, the system further comprises: a second module, being used to, when the second account decides to participate in the test of the smart contract, transfer a part or all of assets of the second account from the mainchain to the sidechain and generate a corresponding mirror image account, so that the second account is able to, independent of the mainchain, perform the test against the smart contract on the sidechain, and is configured to permit the third account to conduct mining on the sidechain; a third module, being used to receive the vulnerability of the smart contract promulgated by the mirror image account during the test and to receive a vote made when a total call frequency of the smart contract reaches a preset value; and being configured to promulgate the vulnerability and the vote to a fourth module; and the fourth module, being configured to perform data interaction with the third modules of plural said mirror image accounts and being configured to, based on information about the plural said mirror image accounts, determine whether it is appropriate to deploy the smart contract onto the mainchain. The subject matter of the present invention at least has the following advantages. First, a smart contract is tested on a sidechain independent of its mainchain, so the mining act of a second account forms no impact on normal interaction between accounts and the contract on the mainchain, and the smart contract brings about no economic loss to accounts on the mainchain. A fourth account on the mainchain is not allowed to participate in a sidechain test for the smart contract and become a second account unless the second module grants permission to it, and this effectively prevents malicious attack to a smart contract on a sidechain from a fourth account on the mainchain. A vulnerability of a smart contract detected on the sidechain will not cause economic loss to the second accounts and the first account, and vulnerabilities in the smart contract can be revised by the first account. Second, since a smart contract can be tested by numerous second accounts on the sidechain, even if a second account tries to hind a vulnerability of the smart contract, the fourth module can effectively detect the vulnerability and thereby effectively prevent the malicious second account from conducting malicious attack when the smart contract is officially deployed. Third, since a smart contract can be tested by numerous second accounts on the sidechain, the second accounts can be more capable of detecting vulnerabilities existing in a smart contract at more levels from more perspectives, and can promulgate their votes for whether the smart contract can be officially deployed, providing advice that facilitates the decision-making process of the first account.

According to one mode, the system further comprises a supervision module, being used to receive requests from the mirror image accounts during the sidechain tests for the smart contract, so as to allow data interaction between the first account and the mirror image accounts with an access permission granted by the supervision module; and/or allow data interaction between the plural mirror image accounts with an access permission granted by the supervision module.

According to one mode, the system further comprises a sidechain creation module, in which when the second account decides to participate in the test for the smart contract, the sidechain creation module at least creates at least one said sidechain based on information about the second account, so that the mirror image account is able to perform the test on its corresponding sidechain.

According to one mode, when the second account promulgates a Vote request to the supervision module, the second account promulgates its vote to the fourth module through the third module, in which the third module is configured to acquire a vote value that represents voting intention of the second account at a voting node, and, according to a homomorphic public key generated by a counting node using a homomorphic encryption algorithm, to encrypt each said vote value so as to generate an encrypted value, and then to transmit the encrypted value to the fourth module.

According to one mode, the system further comprises a promulgate module, before the smart contract is deployed to the sidechain of each said second account, the first account selects suitable said second accounts through a promulgate module of the system based on a list of the second accounts acquired from the first module, and sends information about the selected second accounts to the second module and the sidechain creation module through the promulgate module, in which, after the sidechain creation module creates the sidechains based on the second accounts selected by the first account, the second module, based on the second accounts selected by the first account, transfers the assets of the suitable second accounts from the mainchain to the sidechains and grants the suitable second accounts with permission to conduct the tests on the sidechains.

According to one mode, when the supervision module receives a Quit request promulgated by the mirror image account, a settlement module in the system settles assets of the mirror image accounts during the tests and the second module transfers the settled assets of the mirror image accounts from the sidechains to the mainchain, after which the second module freezes the mirror image accounts on their corresponding sidechains.

According to one mode, when the supervision module receives a Revoke-Test request promulgated by the first account, the settlement module, based on contribution indexes of all the mirror image accounts during the tests for the smart contract, distributes rewards to asset accounts of the second accounts, and the second module transfers the asset accounts of the second accounts to the asset accounts of the second accounts in the mainchain, after which the sidechain creation module revokes the sidechains.

According to one mode, when the total call frequency of the smart contract reaches the preset value, the supervision module freezes the sidechains, and the third module prompts the second accounts to vote.

According to one mode, the present disclosure also discloses a sidechain testing method for improving security and stability of a smart contract, for discovering a vulnerability of the smart contract, being characterized in that the method comprises: a second account decides whether to participate in a test for the smart contract when it acquires the smart contract through the first module, a third account, when it has acquired the smart contract, forks a mainchain so as to form a sidechain and deploys the smart contract on the sidechain; when the second account decides to participate in the test of the smart contract, a second module transfer a part or all of assets of the second account from the mainchain to the sidechain and generate a corresponding mirror image account, so that the second account is able to, independent of the mainchain, perform the test against the smart contract on the sidechain, and is able to permit the third account to conduct mining on the sidechain; a third module promulgates the vulnerability of the smart contract promulgated by the mirror image account during the test and a vote made when a total call frequency of the smart contract reaches a preset value to a fourth module; and the fourth module, based on information about the plural said mirror image accounts, determine whether it is appropriate to deploy the smart contract onto the mainchain; wherein the fourth module is able to perform data interaction with the third modules of plural said mirror image accounts.

According to one mode, the method further comprises a supervision module receiving requests from the mirror image accounts during the sidechain tests for the smart contract, so as to allow data interaction between the first account and the mirror image accounts with an access permission granted by the supervision module; and/or allowing data interaction between the plural mirror image accounts with an access permission granted by the supervision module.

DETAILED DESCRIPTION

Figure 1:
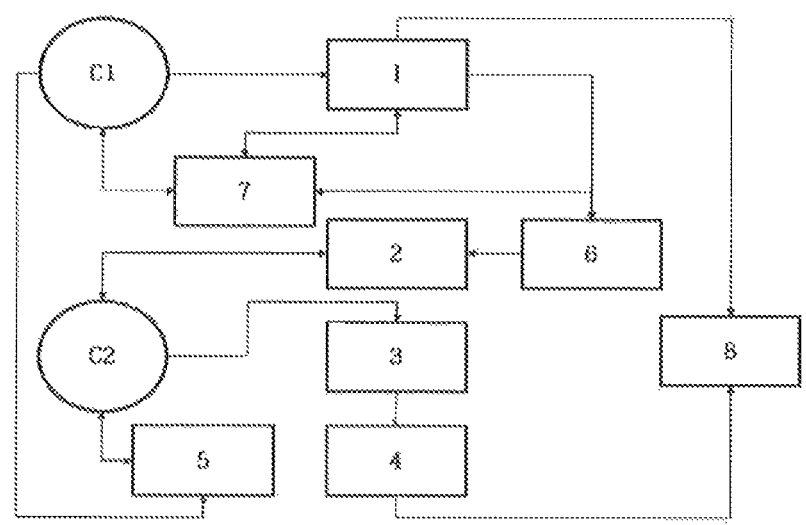
FIG. 1 is a modular drawing illustrating a sidechain testing system for ensuring security and stability of a smart contract according to the present invention.

The invention as well as a preferred mode of use, further objectives and advantages thereof will be best understood by reference to the following detailed description of illustrative embodiments when read in conjunction with accompanying drawings FIGS. 1 through 4.

Embodiment 1

The present embodiment discloses a sidechain testing system for improving security and stability of a smart contract. Terms not specifically defined in this specification have meanings recognized by those skilled in the art in light of the technology and context. However, unless otherwise specified, throughout the present specification the following terms have the meanings indicated below:

The term "first account C1" refers to the creator of a smart contract.

The term "second account C2" refers to an ordinary account that performs a test.

The term "third account C3" refers to a miner, which packs information interaction entities between accounts in to blocks after a first account C1 promulgates a smart contract.

The term "fourth account" refers to a malicious account, which tries to angle for rewards through, for example, conspiracy without conducting effective tests.

The term "fork" refers to an act of a third account C3 wherein the miner maintains a sidechain B by additional mining in addition to the mainchain.

The term "mainchain" refers to an independent blockchain network that has been officially deployed.

The term "sidechain B" is a collective term of all blockchains that follow a sidechain protocol. The term "sidechain protocol" refers to an agreement by which currency can be safely transferred form a currency mainchain A to another blockchain and can then be safely sent back to the currency mainchain A from another blockchain. A sidechain is for implementing bidirectional anchoring, so as to allow a certain cryptocurrency to be "transferred" between a mainchain A and its sidechains B.

The term "information about a second account C2" refers to information at least including credit, education and discipline of the second account C2.

The term "configuration file" refers to a set of configuration that every Ethereum full node has, which mainly contains information about data locations of some listening ports and blocks in a host. If the present node finds a coinbase account to which reward of blocks is transferred (Mining reward is of a commercial nature according to the operation mechanism of blockchains themselves. When an account initiate a call, all on-chain nodes have to execute the contract once, and the consumed overhead has to be paid by the account in the form of on-chain tokens. The miner first packing the transaction into a block will harvest all the information in the block related to the blockchain such as the execution fee of the transaction), thresholds can be added thereto by miners and accounts, such as amounts. The second accounts satisfying the requirements are added into the sidechain B.

The term "final evaluation function" is for addressing the issue that an account intercepts bugs—receiving vulnerability description information and acting itself as a discoverer to do repeated report for cheating rewards, which needs conspiracy among multiple parties. It is for addressing the problem that a contract promulgator uses its high weight to manipulate the voting results by, for example, determining a difference between the two descriptions having the highest weights is smaller than the weight of the contract promulgator with and without a contract promulgator participating in. If yes, it is determined that the vote of the initiator is invalid and it is to verify whether the account described by the vulnerability first promulgated through the submarine commitments is the account having the highest vote weight.

The term "submarine commitment" is such used that an account discovering a vulnerability uses an encryption method such as homomorphic encryption to encrypt the vulnerability description and promulgates it, and after a certain number of blocks, it promulgates a secret key. At this time, the blockchain has been mined for a certain period of time after the block in which the vulnerability description is, so the data cannot be easily tampered, and this effectively prevents bug interception by any account.

The term "smart contract" refers to a set of commitments digitally defined for participating parties of the contract to execute.

The term "special transaction" refers to a vehicle for information interaction among blockchains. It mainly contains "data", the sending address "from" and the receiving address "to." In the disclosed system, transactions that are sent from addresses such as official fork contracts as special transactions, and the transactions received from this types of addresses are packed into block, which are further stringed together to form a chain-like structure.

The term "mining" refers to an act through which information interaction entities (transactions) among accounts are packed into blocks and added to the tail of the existing blockchain so as to continuously lengthening the blockchain such that all transaction information on the chain from the first block can be traced.

The information about the second account C2 at least includes its credit information, education information and discipline information.

At least a part of modules of the system is arranged on blockchain nodes and is connected to the blockchain network for detecting vulnerabilities in a smart contract. The system at least comprises a first module 1, a second module 2, a third module 3 and a fourth module 4. The first module 1 has network-access communication interface for allowing access to the blockchain network. The first module 1 has an input interface, through which the first account C1 promulgates the smart contract. The first module 1 transmits the smart contract to the second accounts C2 and the third accounts C3 through the blockchain network, so that the second accounts C2 can determine whether to participate in the tests through the second module 2 and the third accounts C3 can deploy the smart contract on the sidechain. The second module 2 has a network-access communication interface, for allowing access to the blockchain network. The second module 2 has an input interface through which the second accounts C2 can input their confirmation of participation to the tests and send the confirmation to the third accounts C3. The third module 3 has a network-access communication interface for allowing access to the blockchain network. The third module 3 has an input interface for receiving voting information from the second accounts 2 (or their mirror image accounts C2-1). The fourth module 4 has a communication interface through which the third module 3 can send the voting information to the fourth module 4 for computation. The result of the computation is then fed back to the first account C1 and used as a basis to determining whether the smart contract is promulgated to the mainchain.

Figure 2:
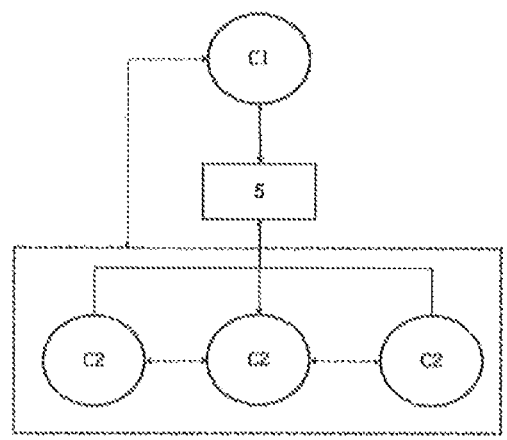
FIG. 2 is a schematic drawing of data interaction between a first account C1 and second accounts C2 in the system of the present invention.

Preferably, as shown in FIG. 2, the first module 1 allows access to the blockchain network and receives the smart contract promulgated by the first account C1, so that the second accounts C2 in the blockchain network can determine whether to participate in the tests with the knowledge of the state of the smart contract. The third accounts C3 in the blockchain network fork the mainchain A to form a sidechain B and deploys the smart contract to the sidechain B. For example, when drafting a smart contract, the first account C1 may add keywords to the smart contract. The added keywords include registration fee reward of the second accounts C2, the mining reward of the second accounts C2 and the report reward of the second accounts C2. Then the smart contract is promulgated to the second accounts C2 as a network-wide announcement in the form of a special transaction.

The first module 1 calls for an official fork contract according to the new keywords to conduct forking and generate a configuration file. The new keywords may be related opcodes added into EVM of Ethereum or testContact added into the smart contract. The second accounts C2, according to the configuration file, determine whether to participate in the tests for the smart contract through the first module 1. If a second account C2 decides to participate in a test for the smart contract, the first module 1 sends information about that second account C2 to the fourth module 4 and feeds back the same to the second module 2. If a second account C2 decides not to participate in a test for the smart contract, the second account C2 remains running the test on the mainchain A. A second account C2 according to its own configuration file determines whether to participate in the present test for the smart contract. A third account C3, or a miner, forks the mainchain to form a sidechain and deploys the smart contract to the sidechain. The second accounts C2 participating in the smart contract run tests on the sidechain.

Preferably, the second module 2 transfers a part or all of the assets of the second accounts C2 from the mainchain A to the sidechain B for the second accounts C2 deciding to participate in tests for the smart contract and generates mirror image accounts C2-1 corresponding to these second accounts C2, so that the second accounts C2 can run tests for the smart contract on the sidechain B independent of the mainchain A as their mirror image accounts C2-1, and can be used to permit the third accounts C3 to conduct mining on the sidechain B. For example, the second module 2 when receiving the conformation of participating tests for the smart contract from a second account C2 transfers the assets of that second account C2 from the mainchain A to the sidechain B by means of bidirectional anchoring. In the process of said transfer, by creating the corresponding mirror image accounts, assets on the mainchain A can be transferred to the mirror image accounts C2-1 on the sidechain B, and the assets on the mainchain A can be frozen. With the foregoing setting, the smart contract is tested on the sidechain B independent of the mainchain A, so the mining act of a third account will not influence the normal interaction between the accounts and the contract on the mainchain A, and the smart contract will not cause economic loss to the accounts on the mainchain A. A fourth account on the mainchain A can only participate in the tests for the smart contract on the sidechain B and becomes a second account when permitted to do so by the second module. This helps to prevent malicious attack by a fourth account on the mainchain A against the smart contract on the sidechain B effectively. A vulnerability found in the smart contract on the sidechain B will not cause direct economic loss to the second accounts and the first account directly.

Preferably, the third module 3 receives information about vulnerabilities in the smart contract promulgated when the second accounts C2 conduct the tests and receives information about votes when the total call frequency of the smart contract reaches a preset value. It is also able to promulgate the information about the vulnerabilities and the votes to the fourth module 4. The second account C2 permits a call for the smart contract on the sidechain B after the test on the sidechain B and it promulgates information about the vulnerabilities of the contract through the third module 3. Moreover, in the present invention, there is a threshold set for the call frequency of the smart contract. The threshold may be written into the smart contract by the first account C when new keywords are added. When the call frequency of the smart contract reaches the threshold, the second accounts C2 have to vote through the third module 3. The votes are encrypted and transmitted to the fourth module 4. The fourth module 4 performs data interaction with the plural second accounts C2 through the third module and determines whether the smart contract can be deployed on the mainchain A according to the information about the plural second accounts C2. In an example where there are totally X votes made by the second accounts C2, including M votes against deployment, N abstention votes, and P votes in favor of deployment, the supportive rate a is P/X*100%. If a is greater than a threshold b set in the fourth module 4, the smart contract can be deployed onto A. In another example, there are totally X votes (one vote per person) made by the second accounts C2, including M votes against deployment, N abstention votes, and P votes in favor of deployment, and every second account C2 has a dimensional evaluation c. That is, every second account has a voting contribution index $c_i$. In this case, the supportive rate a is $\Sigma c \cdot P/X^2$. The dimensional evaluation c is mapped according to the information about the second account C2, e.g., c=f(d, g, e), where d is education information, g is discipline information, and e is credit information. For example, d includes three ranks: $d_1$(Bachelor), $d_2$(Master) and $d_3$(Below Bachelor). g includes two ranks: g1(Computer discipline) and $g_2$(Non-computer discipline). e includes four ranks: $e_1$(High credit score), $e_2$(Medium credit score), $e_3$(Low credit score) and $e_4$(Poor credit score). c may be the multiplication of the three or the addition of the three. For example, a second account is Master in Computer discipline with High credit score, so c=$d_2$*$g_1$*$e_1$. In the present embodiment, if the second account has a poor credit score, the first account has the right to forbid it to participate in the present test for the smart contract, and this helps to prevent a malicious comment from influencing the result of evaluation. Since the smart contract can be tested by numerous second accounts C2 on the sidechain B, this can effectively prevent second accounts C2 having hidden purposes from doing malicious attacks when the smart contract is officially deployed. Since the smart contract can be tested by numerous second accounts C2 on the sidechain B, the second accounts C2 can be more capable of detecting vulnerabilities existing in a smart contract at more levels from more perspectives, and can promulgate their votes for whether the smart contract can be officially deployed, providing advice that facilitates the decision-making process of the first account C1.

Preferably, the system further comprises a supervision module 5. Specifically, the supervision module 5 receives requests from the second accounts C2 during tests for the smart contract on the sidechain B, so that the first account C1 and the second accounts C2 can conduct data interaction with the access permission granted by the supervision module 5. Additionally or alternatively, during tests for the smart contract on the sidechain B, plural second accounts C2 can conduct data interaction with the access permission granted by the supervision module 5. Requests are acts of a second account C2 and may include technical inquiry acts during tests for the smart contract, reward distribution acts during tests for the smart contract, and illegal acts (e.g., malicious intervention and other acts by second accounts C2).

Preferably, the system further comprises a sidechain creation module 6. Where a second account C2 decides to participate in a test for the smart contract, the sidechain creation module 6 can at least create at least one sidechain B based on information about the second account C2, so that plural second accounts C2 can conduct tests on their corresponding sidechains. For example, the sidechain creation module 6 can create one sidechain. For example, the sidechain creation module 6 can create plural sidechains by evenly distributing credit information of the second accounts C2 deciding to participate in the present smart contract. As another example, the sidechain creation module 6 can create plural sidechains by evenly distributing education information of the second accounts C2 deciding to participate in the present smart contract. With the foregoing setting, the present invention enables second accounts C2 to conduct tests on sidechains, thereby effectively preventing some second account(s) C2 from maliciously intervening in mining and voting of other second accounts C2, and effectively preventing some second account(s) C2 from instigating other second accounts C2 to do concealment. Secondary, since second accounts C2 can conduct tests on independent sidechains, they can effectively call for the smart contract for testing, so that the second account C2 can detect vulnerabilities before the threshold is reached.

Preferably, where a second account C2 promulgates a Vote request to the supervision module 5, the second account C2 can promulgate its vote to the fourth module 4 through the third module 3. Therein, the third module 3 is configured to acquire a vote value that represents voting intention at a voting node for the second account C2, and, according to a homomorphic public key generated by a counting node using a homomorphic encryption algorithm, to encrypt each said vote value so as to generate an encrypted value, and then to transmit the encrypted value to the fourth module 4. The fourth module 2 decrypts the encrypted value. Preferably, the vote value may be 0 or 1, wherein 0 represents that the voting account opposes to deploying the smart contract to the mainchain A, and 1 represents that the voting account support deploying the smart contract to the mainchain A. Preferably, the vote value further include a void value representing that the voting account waives its right. The account inputting the void value shall return the registration reward. Preferably, the homomorphic encryption algorithm is EC-Elgamal homomorphic encryption algorithm. Specifically, the homomorphic EC-Elgamal algorithm is implemented through the following steps:

Generation of parameters: E is an elliptic curve in a wired domain GF(p), n is the order of the curve E, and G is the base point of the curve E.

Generation of a secret key: an integer x is randomly selected from GF(p) for calculation of a public key Y=xG.

Encryption: the public key Y and a plaintext m are input. A random number k is selected from the interval of [1, n−1] for calculation of R=kG; calculation of S=m+kY to output a ciphertext (R, S).

4 Decryption: the private key x and the ciphertext (R, S) are input for calculation of m=S−xR to output the plaintext m.

Preferably, the homomorphic EC-Elgamal algorithm includes an EC-Elgamal addition homomorphic algorithm: $D(E(m_1)+E(m_2))=D(E(R_1, S_1)+E(R_2, S_2))=D(E(k_1G, m_1+k_1Y)+E(k_2G, m_2+k_2Y))=D(E(k_1G+k_2G, m_1+k_1Y+m_2+k_2Y))=m_1+m_2+k_1Y+k_2Y-x(k_1+k_2)G=m_1+m_2$, where D represents homomorphic addition of the encrypted data, and $m_1$ and $m_2$ represent a first plaintext and a second plaintext respectively while $k_1$ and $k_2$ represent a first random number and a second random number, respectively.

Additionally, the homomorphic encryption algorithm may alternatively be a Paillier homomorphic algorithm.

Preferably, the system further comprises a promulgate module 7. The second accounts C2 include professional miners, ordinary miners and ordinary accounts, which are irregular in terms of education, discipline and credit. For example, a part of second accounts C2 involved malicious acts in previous tests for the smart contract, such as hindering vulnerabilities, exaggerating vulnerabilities, interfering with the first account C1, and instigating other accounts to do improper acts, and these second accounts C2 are likely to adversely affect the present smart contract. Therefore, before the smart contract is deployed to the sidechains of the second accounts C2, the first account C1 selects suitable second accounts C2 through the promulgate module 7 based on the list of second accounts C2 acquired from the first module 1, and sends the same to the second module 2 and the sidechain creation module 6 through the promulgate module 7. Therein, after the sidechain creation module 6 creates sidechains based on the second accounts 2 selected by the first account C1, the second module 1 transfers the assets of the suitable second accounts 2 from the mainchain A to the sidechains based on the second accounts 2 selected by the first account C1, and grants the suitable second accounts C2 with permission to conduct tests on the sidechains. With the foregoing setting, the present invention at least has the following advantage. The first account C1 can determine whether the second accounts C2 are permitted to participate in tests for the smart contract based on information about the second accounts C2. For example, the second accounts C2 having obviously low credit values may be sieved out from the list, so as to enhance effectiveness of this smart contract test. The first account C1 determines the ratio between the professional testers and ordinary testers based on the information about the second accounts, so as to ensure full detection of vulnerabilities of the smart contract on the sidechains at all levels. Particularly, a professional tester is capable of determining whether the smart contract as a whole satisfies some certain regulations and procedures, while an ordinary testing is capable of whether the smart contract as a whole can be trusted.

Preferably, where the supervision module 5 receives a Quit request promulgated by a second account C2, a settlement module 8 in the system calculates the assets of the second accounts C2 in the process of tests. The second module 2 transfers the calculated assets of the second accounts C2 from the sidechains to the mainchain A. Then the second module 2 freezes the sidechains of the second accounts C2. The keywords newly added to the smart contract mainly involve reward distribution during tests for the smart contract. When the first account C1 promulgates the smart contract, reward rules for his part are written into the settlement module 8 by the first account C1. When a second account C2 promulgates a Quit request, the settlement module 8 calculates the profit it generates during the test and adds the result to the assets on the sidechain (or the assets in the mirror image account). Then the second module 2 transfers the result to the mainchain A. The second module 2 freezes the sidechain of the second account C2, so that the corresponding third account C3 is prevented from keeping mining on the sidechain.

Preferably, where the supervision module 5 receives a Revoke-Test request promulgated by the first account C1, the settlement module 8 distributes rewards to the asset accounts of the second accounts C2 based on all the contribution indexes of the second accounts C2 during their tests for the smart contract, and the second module 2 transfers the asset accounts of the second accounts C2 to the asset accounts of the corresponding mirror image accounts C2-1 on the mainchain A. The sidechain creation module 6 revokes the sidechain B. The first account C1 has permission to revoke tests during tests for the smart contract on sidechains. The settlement module 8 calculates and distributes rewards during tests based on reward rules. The distributed rewards are added to the assets in the asset accounts of the mirror image accounts C2-1 and then transferred from sidechains to the mainchain. At last, the sidechain creation module 6 finishes the test by revoking all the sidechains.

Preferably, where the total call frequency of the smart contract reach the threshold, the supervision module 5 freezes the sidechains, and the third module 3 prompts the second accounts C2 to vote.

Embodiment 2

The present embodiment discloses a sidechain testing method for improving security and stability of a smart contract, for discovering a vulnerability of the smart contract, being characterized in that the method comprises:

a second account C2 decides whether to participate in a test for the smart contract when it acquires the smart contract through the first module 1, a third account C3, when it has acquired the smart contract, forks a mainchain A so as to form a sidechain B and deploys the smart contract on the sidechain B;

when the second account C2 decides to participate in the test of the smart contract, a second module 2 transfer a part or all of assets of the second account C2 from the mainchain to the sidechain B and generate a corresponding mirror image account C2-1, so that the second account C2 is able to, independent of the mainchain, perform the test against the smart contract on the sidechain 13, and is able to permit the third account C3 to conduct mining on the sidechain B;

a third module 3 promulgates the vulnerability of the smart contract promulgated by the mirror image account C2-1 during the test and a vote made when a total cal frequency of the smart contract reaches a preset value to a fourth module 4; and the fourth module 4, based on information about the plural said mirror image accounts C2-1, determine whether it is appropriate to deploy the smart contract onto the mainchain;

wherein the fourth module 4 is able to perform data interaction with the third modules 3 of plural said mirror image accounts C2-1.

According to one mode, the method further comprises a supervision module 5 receiving requests from the mirror image accounts C2-1 during the sidechain tests for the smart contract, so as to allow data interaction between the first account C1 and the mirror image accounts C2-1 with an access permission granted by the supervision module 5; and/or allowing data interaction between the plural mirror image accounts C2-1 with an access permission granted by the supervision module 5.

Embodiment 3

The present embodiment is a preferred sidechain testing method for security and stability of a smart contract.

After the smart contract is promulgated, the first account C1 disseminates the rewards as special transactions in a flooding manner. The second account C2, after receiving the notice through the first module 1, decides whether it participates in the test for the contract according to its own configuration file. When the call frequency reaches the threshold, the second account C2 votes through the third module 3 and reaches consensus at the fourth module 4. The consensus result is at least fed back to the first account C1 or a supervision party for the later to decide whether the contract is deployed onto the mainchain A. The second account C2 has the rewards settled by the settlement module 8 and mines rewards for blocks on the sidechain. After promulgated, a smart contract may still not be deployed onto the mainchain A in at least the following two cases. First, the first account C1 revokes the promulgation and the second accounts C2 reach consensus that the contract has vulnerabilities. In the event of any of the two cases, the settlement module 8 settles the accounts according to the reward rules for special transactions.

Figure 3:
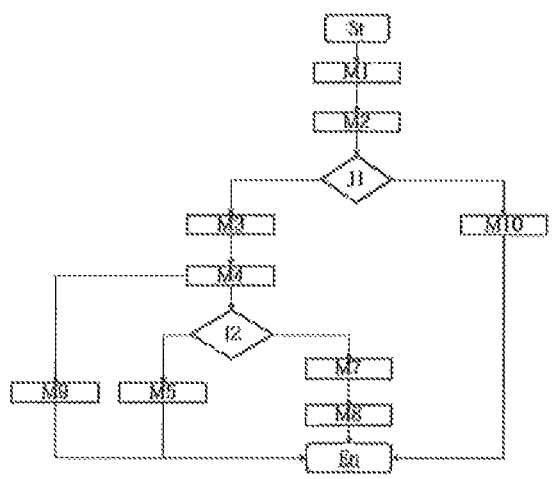
FIG. 3 is a flowchart of a preferred mode of a method according to the present invention.
Figure 4:
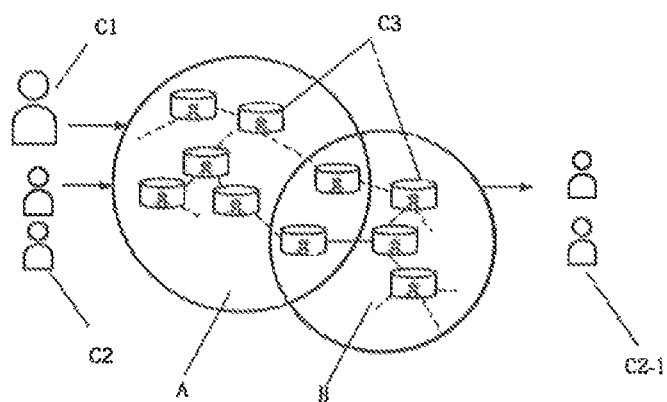
FIG. 4 is a schematic drawing of a preferred mode of a system according to the present invention.

As shown in FIG. 3, the sidechain testing method of the present embodiment at least comprises steps M1, M2, M3, M4, M5, M6, M7 and M8.

In Step M1, the first account C1 when drafting a contract may use, for example, new keywords (by adding relevant opcodes in EVM of Ethereum), so as to call for an officially forked contract, and specifies reward rules using parameters of the method, thereby issuing special transaction notices to the miners and the accounts.

Step M1 comprises the following sub-steps:

In M11, the first account C1 drafts the contract, and adds a new keyword testContract (including the registration fee reward and the second account reward) at the end of the contract.

In M12, the new smart contract is promulgated. According to the smart contract with the newly added keyword, the official fork contract is called for and a network-wide announcement is made for special transactions. The third accounts C3 can all decide whether to join the sidechains according to the configuration file through the first module 1. If not, they stay on the mainchain A and keep mining. Otherwise, the method turns to Step M2.

In Step M2, a second account C2 when receiving the special transaction refers to detailed fork rules set forth in the configuration file. According to the mining rewards provided by the first account C1, it is to determine whether it shall move to a sidechain node for mining, the second account makes determination. In J1, the second account decides whether it participates in the test according to the account reward. If not, Step M10 is performed, and the second account stays on the mainchain A without operation. If yes, the method turns to Step M3. At the same time, the sidechain official contract records the address of the second account C2 and assigns a weight according to the account credit score. If the credit score is lower than the fixed threshold S, the account or the miner is forbidden participating in the test. At last, the second account C2 pay the margin.

In Step M3, the sidechain creation module 6 deploys the smart contract on the sidechain. The assets of the second accounts that participate in the test are locked on the mainchain A by the second module 2 using, for example, bidirectional anchoring and then released to the corresponding mirror image accounts on the sidechains.

M3 specifically comprises the following sub-steps:

In M31, the assets of the second account C2 are frozen in the fork contract on the mainchain A.

In M32, on the sidechain, the corresponding mirror image accounts are generated according to account addresses, and the assets corresponding to the accounts are generated in the mirror image accounts.

In Step M4, the second accounts C2 start to mine on sidechain nodes, while calling for the smart contract on the sidechains. If any account detects a vulnerability of the contract, that second account C2 promulgates this through the third module 3 and the fourth module 4 reports this vulnerability using underwater consensus or a trusted account by submitting the address of the receiving account. After an investigation proves that it is the case, most of the rewards deposited in the address of the fork contract are transferred to the address of the reporter.

In Step M5, if a second judgment J2 is conducted and the total call frequency of the contract reaches the predetermined maximum value F, the second accounts C2 vote through the third module 3 and the fourth module 4 acknowledges consensus. If no problem is risen, the sidechains are merged with the mainchain A, and the assets of the mirror image accounts on the sidechains are settled by the settlement module 8 and transferred back to the mainchain A by the second module 2. The mining nodes of the sidechains share the mining rewards provided by the first account C1 according to the number of blocks they gain, and the method turns to Step M6. In the predetermined maximum value F is not reached, promulgation of the contract fails in either of the following two cases: 1) the second accounts C2 reach consensus that the contract has vulnerabilities, and the method turns to Step M7; and 2) in M9, the first account C1 revokes the test and the method turns to Step M8.

M5 specifically comprises the following sub-steps:

In M51, the smart contract has been repeatedly called for on the sidechain, and the call frequency reaches a predetermined maximum value M. At this time, all the accounts participating in tests for the contract try to reach consensus about whether the contract is deployed onto the mainchain A.

In M52, the account amount locked on the mainchain A is re-divided according to the amount in the mirror image account at the time of return.

In Step M6, when the contract is smoothly deployed to the mainchain A, since there is no valid vulnerability detected, it is deemed that all the accounts participating in tests contribute equally. At this time, the accounts divide up the rewards according to weights in direct proportion to their credit scores.

In Step M7, in the event that a vulnerability reported by an account is preliminary acknowledged, the fourth module 4 first calls for the final evaluation function to determine whether the first account C1 of the contract uses its heavy weight to recover rewards. If yes, its vote is deemed invalid. If a third account C3 gives up a node it finds on a new chain and synchronizes blocks from a node on the mainchain A, the state of the assets automatically returns to that as it was before forking. Then the parties on the sidechains start to divide up rewards and prepare to terminate the operation.

Step M7 specifically comprises the following sub-steps:

In M71, the second accounts C2 can get the registration rewards as well as a proportion F of the account rewards, and the rest of the account rewards are divided up by the accounts vote for them according to their credit scores.

In M72, the miner rewards are divided up according to the mined blocks. The credit scores of the accounts are updated according to whether the voting result is correct. Then the margins are returned to the second accounts C2.

In Step M8, the initiator of the smart contract, i.e. the first account C1, returns the stepped account and miner rewards according to the early termination time, so as to save rewards for the resources of the participating parties. The miners and the accounts divide up the remainder of their respective rewards according to their credit scores, and the margins are returned to their payers.

In FIG. 3, St represents the start and En represents the end.

The term "module" as used herein describes any type of hardware, software, or combination of software and hardware that is capable of performing the functions associated with "module."

It should be noted that the above specific embodiments are exemplary, and those skilled in the art can come up with various solutions inspired by the disclosure of the present invention, and these solutions also fall into the scope of the present disclosure and fall into the present Within the scope of the invention. Those skilled in the art should understand that the description of the present invention and the accompanying drawings are illustrative and do not limit the claims. The scope of protection of the present invention is defined by the claims and their equivalents.

What is claimed is:

1. A sidechain testing method for improving security and stability of a smart contract, for discovering a vulnerability of the smart contract, the method comprising:

deciding, by a second account, whether to participate in a test for the smart contract when it acquires the smart contract through a first processor, providing a fork in a mainchain, by a third account, when it has acquired the smart contract, to form a sidechain and deploy the smart contract on the sidechain when the second account decides to participate in the test of the smart contract, transferring, by a second processor, a part or all of assets of the second account from the mainchain to the sidechain and generate a corresponding mirror image account, so that the second account is able to, independent of the mainchain, perform the test against the smart contract on the sidechain, and k able to permit the third account to conduct mining on the sidechain;

promulgating, by a third processor, the vulnerability of the smart contract promulgated by the mirror image account during the test and voting when a total call frequency of the smart contract reaches a preset value to a fourth processor;

determining, by the fourth processor, based on information about the plural said mirror image accounts, whether it is appropriate to deploy the smart contract onto the mainchain performing, by the fourth processor, data interaction with the third processor of plural said mirror image accounts;

receiving, by a supervision processor, requests from the mirror image accounts during the sidechain tests for the smart contract, so as to allow data interaction between the first account and the mirror image accounts with an access permission granted by the supervision processor;

allowing data interaction between the plural mirror image accounts with an access permission granted by the supervision processor;

creating, by a sidechain creation processor, when the second account decides to participate in the test for the smart contract, at least one said sidechain based on information about the second account, so that the mirror image account is able to perform the test on its corresponding sidechain.

* * * * *